United States Patent
Valero et al.

(10) Patent No.: US 11,584,257 B2
(45) Date of Patent: Feb. 21, 2023

(54) METHOD FOR REDUCING THE OVERALL POWER CONSUMPTION OF A PARKED VEHICLE

(71) Applicant: VOLVO TRUCK CORPORATION, Gothenburg (SE)

(72) Inventors: Maxime Valero, Meyzieu (FR); David De Brito, Charvieu (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/062,744

(22) Filed: Oct. 5, 2020

(65) Prior Publication Data

US 2022/0105831 A1   Apr. 7, 2022

(51) Int. Cl.
| | |
|---|---|
| *B60L 58/22* | (2019.01) |
| *H02J 7/00* | (2006.01) |
| *B60L 50/50* | (2019.01) |
| *B60L 58/40* | (2019.01) |

(52) U.S. Cl.
CPC .............. *B60L 58/22* (2019.02); *B60L 50/50* (2019.02); *H02J 7/0014* (2013.01); *H02J 7/0048* (2020.01); *B60L 2210/10* (2013.01); *B60L 2240/547* (2013.01)

(58) Field of Classification Search
None
See application file for complete search history.

(56) References Cited

U.S. PATENT DOCUMENTS

| | | | | |
|---|---|---|---|---|
| 6,271,645 B1* | 8/2001 | Schneider et al. | .... | H02J 7/0021 320/118 |
| 2004/0130214 A1 | 7/2004 | Murty et al. | | |
| 2005/0151509 A1 | 7/2005 | Cook | | |
| 2011/0050169 A1* | 3/2011 | Akiba | .................. | H02J 7/0016 320/109 |

(Continued)

FOREIGN PATENT DOCUMENTS

| | | |
|---|---|---|
| DE | 102018001301 A1 | 8/2018 |
| EP | 2538521 A1 | 12/2012 |
| EP | 3401150 A1 | 11/2018 |

(Continued)

OTHER PUBLICATIONS

European Search Report (dated Feb. 23, 2022) for corresponding European App. EP21196501.

*Primary Examiner* — Jared Fureman
*Assistant Examiner* — Aqeel H Bukhari
(74) *Attorney, Agent, or Firm* — WRB-IP LLP

(57) ABSTRACT

The invention relates to a method for reducing the overall power consumption of a parked vehicle, whereby said vehicle comprises a DC power network including two batteries connected in series and an equalizer circuit, whereby the equalizer circuit includes a DC/DC converter for converting an input voltage corresponding to the sum of the voltages of the two batteries into an output voltage to be applied to a first battery of the two batteries. The method consists in i) activating the DC/DC converter only when the State of Charge (SoC) of the first battery reaches a first level below the State of Charge (SoC) of the second battery; and u) keeping the DC/DC converter active until the State of Charge (SoC) of the first battery reaches a second level above the State of Charge (SoC) of the second battery.

11 Claims, 2 Drawing Sheets

(56) References Cited

U.S. PATENT DOCUMENTS

2018/0301986 A1* 10/2018 Alves .................. B60L 3/003
2020/0086744 A1* 3/2020 Schumacher ........... B60L 58/22

FOREIGN PATENT DOCUMENTS

| WO | 8401475 A1 | 4/1984 |
| WO | 2009145709 A1 | 12/2009 |
| WO | 2016079705 A1 | 5/2016 |

* cited by examiner

METHOD FOR REDUCING THE OVERALL POWER CONSUMPTION OF A PARKED VEHICLE

TECHNICAL FIELD

The invention relates to a method for reducing the overall power consumption of a parked vehicle.

The invention can be applied in heavy-duty vehicles, such as trucks, buses and construction equipment. Although the invention will be described with respect to a truck, the invention is not restricted to this particular vehicle, but may also be used in other commercial or non-commercial vehicles such as passenger cars and boats.

BACKGROUND

Vehicles, such as trucks or buses, are conventionally provided with their own, on board, electrical system for supplying electrical energy to an electric motor for cranking the engine in order to start it and for operating the lights and accessories of the vehicle. Large engines, particularly diesel engines, require that a very high starting torque be developed by the starting motor. Thus, they have a high power requirement. Storage batteries for vehicles are conventionally manufactured in mass production having a 12V nominal battery voltage. Because of the savings of mass production techniques, such batteries are highly desirable for use on vehicles. Similarly, 12V lights and accessories are manufactured in high quantities and therefore are available most inexpensively.

However, cranking the ICE of a heavy-duty vehicle, such as a truck or a bus, requires a lot of energy. Therefore, such vehicles have been equipped with starting motors operating at higher voltage, e.g. 24V. These motors also are less massive than a 12V motor developing the same torque.

However, if the vehicle is operated with a simple 24V electrical system, it requires lights and accessories designed for 24V operation. This creates a problem because 24V electrical lights and accessories are not as conveniently available as their 12V equivalents and are more expensive because there is such a smaller demand and therefore less cost reduction from mass production and marketing. Additionally, 24V lights, particularly headlamps, have a shorter lifetime than their 12V equivalents.

A commonly adopted solution has been to provide 24V for cranking the engine but 12V for all the lights and accessories. One proposed method for doing this is to provide two duplicate electrical systems, one operating at 24V and the other at 12V. Such systems are expensive to install and to maintain because they require a duplicate investment in batteries, generators, regulators and the like as well as twice as many devices subject to failure and requiring repair.

A better option is to utilize two 12V batteries connected in series. The series voltage is utilized for cranking and the 12V power system is just tapped off across one of these batteries. The difficulty with that system is that one battery supplying the 12V voltage becomes discharged while the other does not.

Equalizers have been developed over the years to balance the voltages of the first and second batteries. The equalizer, comprising a DC/DC converter, is connected to the three battery terminals. It senses any reduction of the voltage of the 12V battery supplying power to the lights and accessories and supplies current to that battery from the other battery until the battery voltages are equalized.

In this respect, U.S. Pat. No. 6,271,645 B1 discloses a method for balancing energy levels between a first battery group and a second battery group in a battery pack. The method includes steps consisting in generating a first state of charge value indicative of a first energy level of said first battery group and a second state of charge value indicative of a second energy level of said second battery group and in controlling said first energy level responsive to said first state of charge value and said second state of charge value so as to balance the first and second energy levels.

Also, WO 2009/145709 A1 discloses a voltage conversion system, which includes a first and a second battery being connected in series with each other, and a converter having a converter input and a converter output, wherein the converter input is connected to at least one of the first and the second battery. The voltage conversion system further includes a voltage conversion system output being connected to one of the first and the second battery, and to the converter output, thereby producing a voltage conversion system output current. If there is a charging level unbalance, a first charging current is applied to the first battery and a second charging current is applied to the second battery, whereby the charging current is highest for the one of said first and second battery having the lowest charging level, for restoring the charging balance between the two batteries.

Eventually. WO 84/01475 discloses a DC power network comprising a series connected pair of batteries and an equalizer circuit for equalizing the voltages of said batteries. The equalizer circuit includes a regulated DC/DC converter for converting electrical energy to the voltage of a first one of said batteries from the sum of the voltages of said batteries. A first battery is connected between a ground terminal and a first phase terminal and the second battery is connected between said first phase terminal and a second phase terminal. In other words, the two batteries are serially connected between the ground terminal and the second phase terminal. The DC/DC converter comprises two input terminals formed by the second phase terminal and the ground terminal and two output terminals formed by the first phase terminal and the ground terminal. The DC/DC converter is controlled to apply a reference voltage to the output terminals. If the battery voltages are designed to be equal, then the reference voltage is equal to one-half the sum of the voltages of the two batteries.

A main problem with that system is that, when the engine is OFF (i.e. alternator OFF), the equalizing procedure leads to an extra consumption on the 24V network, which can be quite high (due to inherent consumption and efficiency).

This can be problematic if the vehicle is parked for a long time, e.g. one or two weeks.

SUMMARY

An object of the invention is to provide a method for reducing the overall power consumption of a parked vehicle. The vehicle comprises a DC power network including two batteries connected in series and an equalizer circuit, whereby the equalizer circuit includes a DC/DC converter for converting an input voltage corresponding to the sum of the voltages of the two batteries into an output voltage to be applied to a first battery of the two batteries.

The method of the invention consists in:

i) activating the DC/DC converter only when the State of Charge (SoC) of the first battery reaches a first level below the State of Charge (SoC) of the second battery; and ii) keeping the DC/DC converter active until the State of Charge (SoC) of the first battery reaches a second level above the State of Charge (SoC) of the second battery.

By the provision of this method, it is anticipated that one of the two batteries in the pack will discharge faster than the other by modifying the balancing procedure. Instead of balancing the two batteries until they reach the same voltage level or the same charge level (SoC), the battery which is more sought is voluntarily brought to a higher state of charge than the other (less sought) battery. This means that, from the time the Equalizer is turned off, it takes a longer time for the most sought battery to reach a low state of charge in which balancing has to be achieved once again. All in all, the DC/DC converter is not activated during the whole period the vehicle is parked, but only when necessary, to keep the batteries roughly at the same SoC for the next start. Accordingly, the overall power consumption of the vehicle during the whole period it is parked is reduced as the DC/DC converter consumes less energy.

According to one embodiment, during balancing, the voltage applied to the terminals of the first battery (also known as the "charging voltage") is controlled to be superior to the nominal voltage of the first battery (Boost mode). Therefore, contrary to prior art systems in which the charging voltage is roughly equal to the sum of battery voltages divided by two, which does not exceed 12,5V, the method of the invention teaches to apply a charging voltage independent of the actual voltage of the High Side Battery and superior to 12,5V, for example 14,15V. Accordingly, balancing process takes much less time than for prior art electric architectures.

More preferably, during balancing, the voltage applied to the terminals of the first battery is controlled to be superior to 14V.

The invention further concerns a DC power network for a vehicle, comprising two batteries connected in series, a DC/DC converter for balancing the two batteries and an electronic control unit for controlling the activation of the DC/DC converter, wherein the electronic control unit is programmed to achieve the method defined above.

Preferably, each battery is a 12V battery, i.e. a battery having a nominal voltage of 12V.

Advantageously, at least a first electrical device of the vehicle is connected in parallel between a ground terminal and a first phase terminal connected between the two batteries and at least a second electrical device of the vehicle is connected in parallel between a ground terminal and a second phase terminal, the two batteries being connected in series between the ground terminal and the second phase terminal.

Preferably, the DC/DC converter comprises two input terminals formed by the second phase terminal and the ground terminal and two output terminals formed by the first phase terminal and the ground terminal.

Optionally, the DC power network further comprises a starter and/or a generator connected across the two batteries connected in series.

Eventually, the invention concerns a vehicle comprising a DC power network as defined above.

Preferably, the DC power network is a low voltage network that is connected to a High Voltage network of the vehicle through another DC/DC converter, In this example, said vehicle is a Battery Electric Vehicle comprising an electrically driven powertrain powered by (i.e. connected to) said High Voltage network.

Further advantages and advantageous features of the invention are disclosed in the following description.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
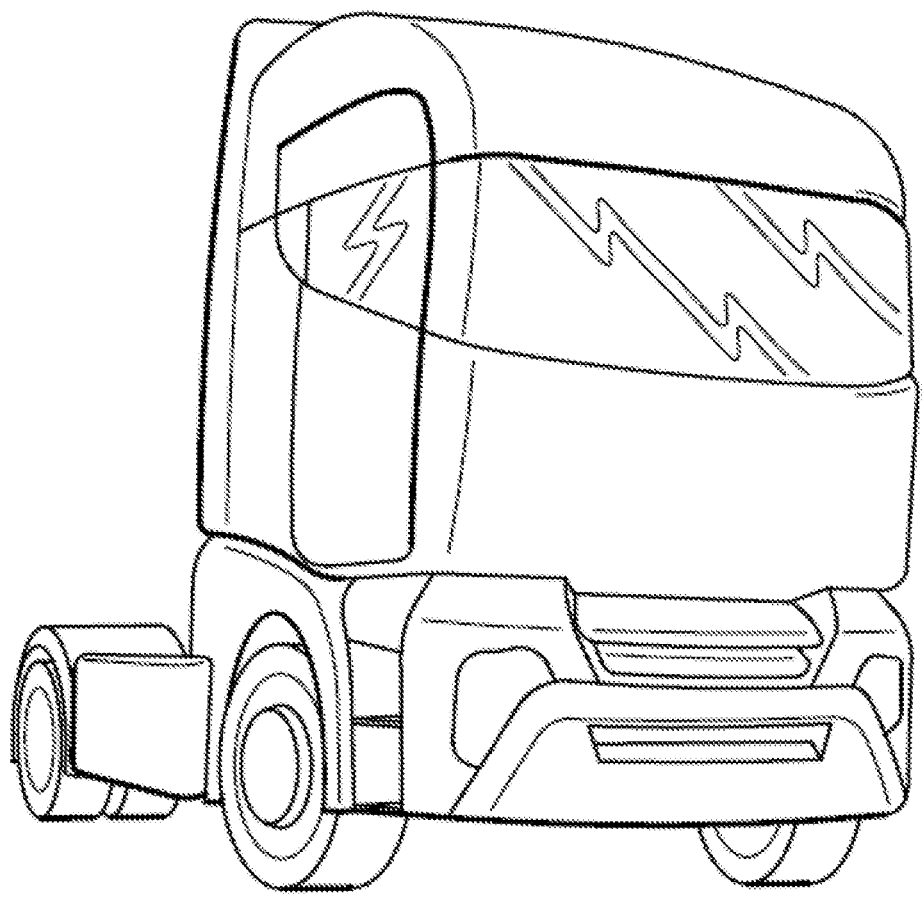
FIG. 1 is a perspective view of a heavy-duty vehicle, typically a truck, comprising a DC power network according to the invention.
Figure 1:

FIG. 1 shows a heavy-duty vehicle 2, typically a truck. Optionally, the vehicle 2 includes an engine, typically a thermal engine working with natural gas, Gasoline or Diesel. In a variant not shown, the vehicle 2 could additionally include one or more electric motors, meaning that the vehicle 2 could be a Hybrid Electric Vehicle (HEV).

Figure 2:
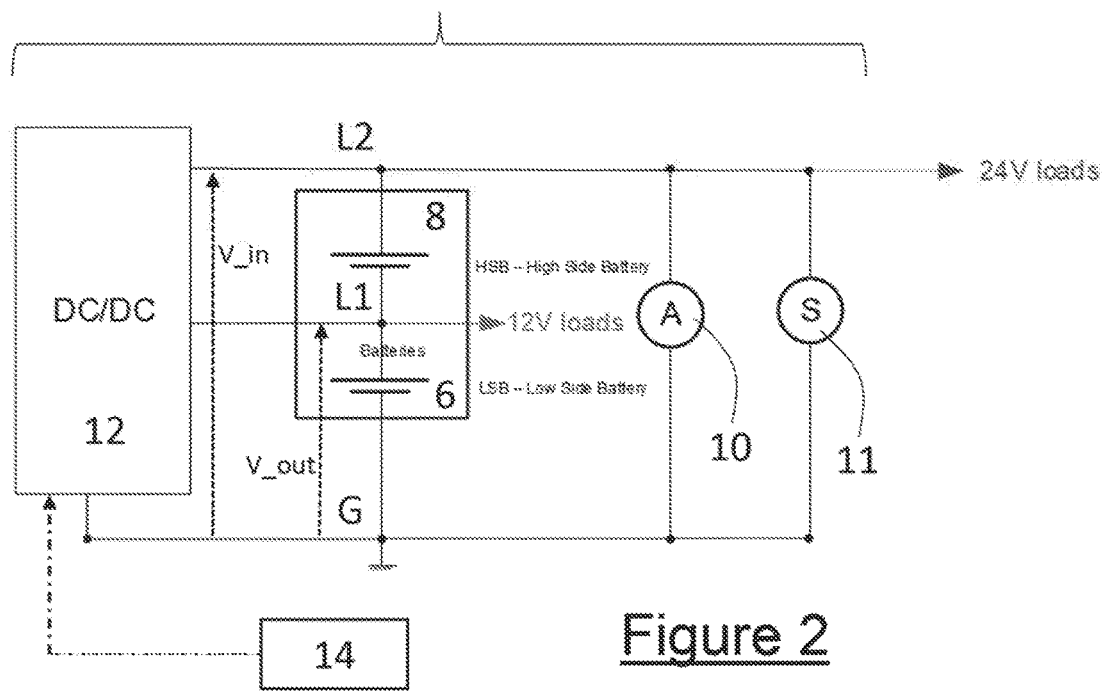
FIG. 2 is an electrical circuit representing the DC power network of the invention.

Vehicle 2 further includes a DC power network 4 that is represented in detail on FIG. 2. As shown on FIG. 2, the DC power network 4 includes two batteries 6 and 8 connected in series, an electrical generator 10 connected across the two batteries 6, 8 and an equalizer circuit.

The first battery 6 is known as the Low Side Battery (LSB) and the second battery 8 is known as the High Side Battery (HSB). In the example, the Low side Battery 6 and the High Side battery 8 are each a 12V lead acid battery. Alternatively, the batteries 6 and 8 could be Lithium ion batteries.

The present invention is not limited to the use of two 12V batteries connected in series.

The present invention can be utilized with batteries of different nominal voltages and also may be utilized with more than two series connected batteries. For example, a 36 or 48V system can be constructed of three or four 12V batteries with the lights and accessories being operated from one of them.

In a variant not shown, the DC power network 4 can include at least one additional pair of batteries connected in parallel to batteries 6 and 8, so as to increase the capacity of the 24V power source.

At least one first electrical device (not shown) of the vehicle 2 is connected in parallel between a ground terminal G and a first phase terminal L1 connected between the two batteries 6, 8 and at least one second electrical device (not shown) of the vehicle 2 is connected in parallel between the ground terminal G and a second phase terminal L2, the two batteries 6 and 8 being connected in series between the ground terminal G and the second phase terminal L2. This means that the second battery 8 is connected between the two terminals L1 and L2.

The electrical device(s) connected to the LSB 6, i.e. connected in parallel to the ground terminal G and to the phase terminal L1, are also known as "12V load(s)" and the electrical device(s) connected to both the LSB 6 and the HSB 8, i.e. connected in parallel to the ground terminal G and to the phase terminal L2, are also known as "24V load(s)".

In the example of the figures, in which the vehicle 2 includes an internal combustion engine, the DC power network 4 further includes a starter 11 (for starting the engine), which is connected across the batteries 6 and 8. In other words, the two terminals of the starter 11 are respectively connected to the ground and to the phase terminal L2. In a variant not shown, the starter 11 could be connected to another DC power network, comprising one or more batteries, typically super-capacitors or Lead Acid batteries, dedicated for starting the engine.

Also, the electrical generator 10 is an alternator connected to the 24V power source formed by the two batteries 6 and 8. This means that the two terminals of the generator 10 are respectively connected to the ground G and to the phase terminal L2. I For example, 24V loads include the engine starter, the ECUs, DC motors, internal and external lamps and 12V loads include the radio system, accessory supply, USB ports and so on.

The equalizer circuit includes a DC/DC converter 12 for converting an input voltage V_in corresponding to the sum of the voltages of the two batteries 6, 8 into an output voltage V_out to be applied to a first battery 6 of the two batteries.

In the example, the DC/DC converter 12 comprises two input terminals formed by the second phase terminal L2 and the ground terminal G and two output terminals formed by the first phase terminal L1 and the ground terminal G.

Therefore, when the DC/DC converter 12 is activated, it draws electric energy from the HSB 8, achieves a voltage conversion and delivers energy at a converted voltage to the LSB 6.

The converted voltage, which corresponds to the charging voltage of the LSB 6, is at least equal to the nominal voltage of the LSB 8, which is 12V. In a preferred embodiment, the DC/DC converter 12 can be controlled to deliver a voltage higher than the nominal voltage of the battery 6, for instance a voltage superior to 14V, e.g. 14,15V. This allows the LSB 6 to be recharged more quickly (Boost mode), thus reducing the activation period of the DC/DC converter 12. This means that the conversion ratio of the DC/DC converter 12 can be modified depending on the output voltage to be delivered.

Accordingly, and contrary to prior art systems, the DC/DC converter 12 is not controlled to ensure voltage balance between LSB 6 and HSB 8: Indeed, in boost mode, the voltage of the LSB can be increased up to a level above that of the HSB 8, e.g. 14.15 V.

When the vehicle 2 is parked, a routine is computed for reducing the overall power consumption during the whole period the vehicle is parked. In this paper, the vehicle is considered to be parked when it is stopped, with the parking brake applied. It goes without saying that, in parked condition, the internal combustion engine (if any) of the vehicle is switched off. Therefore, the alternator 10 is not delivering any power.

The above routine, or method, consists in: i) activating the DC/DC converter 12 only when the State of Charge (SoC) of the first battery 6 reaches a first level below the State of Charge (SoC) of the second battery 8 and ii) in keeping the DC/DC converter 12 active until the State of Charge (SoC) of the first battery 6 reaches a second level above the State of Charge (SoC) of the second battery 8.

In other words, the DC/DC converter 12 is deactivated when the State of Charge (SoC) of the first battery 6 reaches said second level above the State of Charge (SoC) of the second battery 8. At this time, no more energy is drawn from the HSB 8 and the recharging process of the LSB 6 is stopped.

In known manner, the State of charge (SoC) of a battery is the level of charge of the battery relative to its capacity. The units of SoC are percentage points (0%=empty; 100%=full). It is rather easy to determine the SoC of a battery by analysing the intensity of the current that is delivered by the battery, that is why it is not explained in details 35 herein.

Preferably, the DC power network 4 comprises an ECU, also known as "master control unit" 14, to which are provided the state of charge information from the LSB 6 and HSB 8. Basically, the batteries 6 and 8 are provided with sensors (not shown) for measuring the current delivered by the batteries 6, 8. Such sensors send the measured information to the master control unit 14 so as to determine the State of Charge of each battery. The master control unit 14 requests the DC/DC converter 12 to supply a voltage on the low side battery 6 when the difference of state of charge between the two batteries is above a threshold (i.e. when batteries are unbalanced). The master control unit 14 requests the DC/DC converter 12 to stop when the difference of state of charge between the lower and the upper batteries is above a threshold (i.e. the lower side battery has a higher state of charge than the upper battery). The supply voltage is high enough to reduce the time for equalizer activation (the higher the voltage, the higher the current, and thus the lower the time to reach the deactivation condition). The boost mode is mainly intended to be used when engine is OFF (i.e. alternator OFF), to reduce truck/vehicle power consumption.

Typically, the first level to which it is referred to above can be 10%, which means that the DC/DC converter 12 is activated as soon as the SoC of battery 6 is 10% lower than the SoC of battery 8. For example, considering that the SoC of battery 8 is of 80%, the DC/DC converter 12 is activated as soon as the SoC of battery 6 reaches 70%.

Similarly, the second level to which it is referred to above can be 10%, which means that the DC/DC converter 12 is activated until the SoC of battery 6 is 10% higher than the SoC of battery 8. For example, considering that the SoC of battery 8 is of 75%, the DC/DC converter 12 remains activated until the SoC of battery 6 reaches 85%.

Obviously, the first and/or second levels defined above can be different. For instance, the first level can be of 5% and the second level can be of 15%. Charging the LSB 6 at a higher level than HSB 8 anticipates a faster discharge of battery 6 and thus somehow balances the number of charge-discharge cycles of batteries 6 and 8. This ensures that batteries 6 and 8 age more evenly: The LSB 6 does not need to be replaced prematurely compared to the HSB 8.

Therefore, instead of balancing the two batteries 6 and 8 until they reach the same voltage level or the same charge level (SoC), the battery which is more sought, i.e. the LSB 6, is voluntarily brought to a higher state of charge than the other (less sought) battery (HSB 8). This means that, from the time the Equalizer 12 is turned off, it takes a longer time for the most sought battery 6 to reach a low state of charge in which balancing has to be achieved once again. All in all, the DC/DC converter 12 is not activated during the whole period the vehicle is parked, but only when necessary, to keep the batteries 6 and 8 roughly at the same SoC for the next start. Accordingly, the overall power consumption of the vehicle during the whole period the vehicle is parked is reduced as the DC/DC converter 12 consumes less energy.

Figure 3:
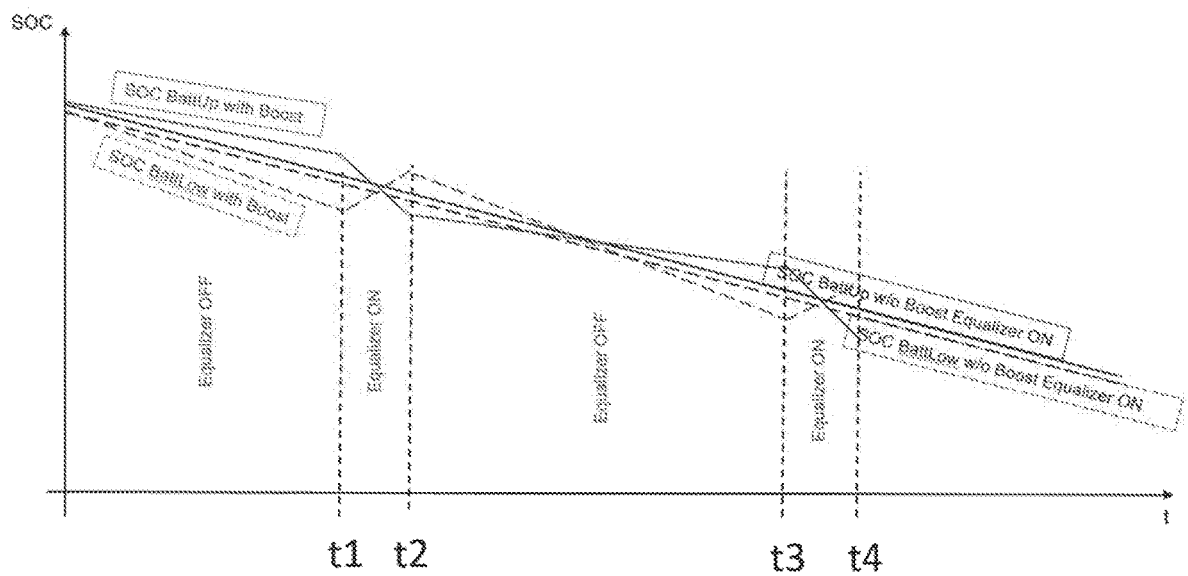
FIG. 3 is a graph representing the State of Charge (SoC) of a first battery and a second battery of the DC power network over time, during different phases of operation.

On FIG. 3, the curve in dotted line represents the SoC of the LSB 6, while the curve in full line represents the SoC of the HSB 8. As shown on that figure, when the equalizer (i.e. the DC/DC converter) is off, both the SoC of LSB 6 and HSB 8 naturally decreases over time. At time t1, the State of Charge (SoC) of the first battery 6 reaches the first level below the State of Charge (SoC) of the second battery 8, which leads to the activation of the DC/DC converter 12 (Equalizer ON). At time t2, the State of Charge (SoC) of the first battery 6 reaches a second level above the State of Charge (SoC) of the second battery 8, which leads to the deactivation of the DC/DC converter 12.

Between times t1 and t2, boost mode is ON, which means that the voltage between the two output terminals L1, G of the DC/DC converter 12 is superior to the nominal voltage of LSB 6, e.g. 14.5V. Accordingly, the SoC of LSB 6 more quickly ramps up to the first threshold above the SoC of HSB 8.

At time t3, the State of Charge (SoC) of the first battery 6 reaches, once again, the first level below the State of Charge (SoC) of the second battery 8, which leads to the activation of the DC/DC converter 12 ("Equalizer ON"). At time t4, the State of Charge (SoC) of the first battery 6 reaches the second level above the State of Charge (SoC) of the second battery 8, which leads to the deactivation of the DC/DC converter 12. Between times t3 an t4, boost mode if off, meaning that the voltage between the two output terminals L1, G of the DC/DC converter 12 is equal to the nominal voltage of LSB 6, e.g. 12V.

According to an alternative embodiment (not shown), the vehicle 2 could be a Battery Electric Vehicle (BEV), i.e. a pure electric vehicle, without any ICE. In such embodiment, there is no alternator connected to the batteries 6 and/or 8. In this case, the DC power network 4 is considered as a Low voltage network that is connected through another DC/DC converter to a High Voltage network comprising a high voltage battery (e.g. 600V) for supplying the traction motor (s) of the vehicle. The High voltage network can thus be used to recharge the batteries 6 and 8 in driving conditions. Such dual electric architecture is for example disclosed in EP 20182878.1, which is incorporated herein.

Also, a Battery Electric Vehicle (BEV) is considered to be parked when it is stopped, with parking brake engaged. In parked conditions, the High Voltage network supplying the electrically driven powertrain is switched off (i.e. disconnected). Therefore, and as for a vehicle with a thermal engine, when the vehicle is parked, the 24V power source comprising the two batteries 6 and 8 connected in series cannot be recharged from an external power source, such as an alternator or a high voltage network.

It is to be understood that the present invention is not limited to the embodiments described above and illustrated in the drawings: rather, the skilled person will recognize that many changes and modifications may be made within the scope of the appended claims.

The invention claimed is:

1. A method for reducing overall power consumption of a parked vehicle, whereby the vehicle comprises a DC power network including two batteries including a first battery and a second battery connected in series and an equalizer circuit, whereby the equalizer circuit includes a DC/DC converter for converting an input voltage corresponding to a sum of voltages of the two batteries into an output voltage to be applied to a first battery of the two batteries, wherein the method comprises:

i) activating the DC/DC converter only when the State of Charge (SoC) of the first battery reaches a first level below the State of Charge (SoC) of the second battery; and
  ii) keeping the DC/DC converter active until the State of Charge (SoC) of the first battery reaches a second level above the State of Charge (SoC) of the second battery.

2. The method according to claim 1, wherein, while the DC/DC converter is active, a voltage applied to terminals of the first battery is controlled to be superior to a nominal voltage of the first battery.

3. The method according to claim 2, wherein, while the DC/DC converter is active, a voltage applied to the terminals of the first battery is controlled to be superior to 14V.

4. A DC power network for a vehicle, the DC power network comprising two batteries including a first battery and a second battery connected in series, and an electronic control unit for controlling activation of the DC/DC converter, wherein the electronic control unit is configured to perform a method for reducing overall power consumption of a parked vehicle, wherein the DC power network includes an equalizer circuit, whereby the equalizer circuit includes a DC/DC converter for converting an input voltage corresponding to a sum of voltages of the two batteries into an output voltage to be applied to a first battery of the two batteries, wherein the method comprises:

i) activating the DC/DC converter only when the State of Charge (SoC) of the first battery reaches a first level below the State of Charge (SoC) of the second battery; and
  ii) keeping the DC/DC converter active until the State of Charge (SoC) of the first battery reaches a second level above the State of Charge (SoC) of the second battery.

5. The DC power network of claim 4, wherein each battery is a 12V battery.

6. The DC power network of claim 4, wherein at least a first electrical device of the vehicle is connected in parallel between a ground terminal and a first phase terminal connected between the two batteries and at least a second electrical device of the vehicle is connected in parallel between the ground terminal and a second phase terminal, the two batteries being connected in series between the ground terminal and the second phase terminal.

7. The DC power network of claim 6, wherein the DC/DC converter comprises two input terminals formed by the second phase terminal and the ground terminal and two output terminals formed by the first phase terminal and the ground terminal.

8. The DC power network of claim 4, further comprising at least one of a starter and a generator connected across the two batteries connected in series.

9. A vehicle comprising the DC power network according to claim 4.

10. The vehicle of claim 9, wherein the DC power network is a low voltage network that is connected to a High Voltage network of the vehicle through another DC/DC converter.

11. The vehicle of claim 10, wherein the vehicle is a Battery Electric Vehicle comprising an electrically driven powertrain powered by the High Voltage network.

\* \* \* \* \*